(12) United States Patent
Wuersch et al.

(10) Patent No.: US 7,754,270 B2
(45) Date of Patent: Jul. 13, 2010

(54) BEVERAGE POWDER

(75) Inventors: Pierre Wuersch, La Tour-de-Peilz (CH); Josef Burri, Epalinges (CH)

(73) Assignee: Nestec S.A., Vevey (CH)

( * ) Notice: Subject to any disclaimer, the term of this patent is extended or adjusted under 35 U.S.C. 154(b) by 724 days.

(21) Appl. No.: 11/383,355

(22) Filed: May 15, 2006

(65) Prior Publication Data

US 2006/0204634 A1    Sep. 14, 2006

Related U.S. Application Data

(63) Continuation of application No. 10/471,512, filed as application No. PCT/EP02/03160 on Mar. 15, 2002, now abandoned.

(30) Foreign Application Priority Data

Mar. 26, 2001    (EP) ................................. 01201127

(51) Int. Cl.
  *A23L 2/00*    (2006.01)
(52) U.S. Cl. .......................... 426/590; 426/93
(58) Field of Classification Search .................. 426/590, 426/93, 28
  See application file for complete search history.

(56) References Cited

U.S. PATENT DOCUMENTS

| 4,311,717 A | 1/1982 | McGinley |
|---|---|---|
| 5,476,675 A | 12/1995 | Lou et al. |
| 6,020,016 A | 2/2000 | Castleberry |
| 6,083,547 A | 7/2000 | Katta et al. |
| 6,168,821 B1 | 1/2001 | Castleberry |
| 7,320,810 B2 * | 1/2008 | Wuersch et al. ............. 426/618 |

FOREIGN PATENT DOCUMENTS

| EP | 0377530 | 7/1990 |
|---|---|---|
| EP | 0606080 | 7/1994 |
| JP | 2124069 | 5/1990 |
| JP | 7265000 | 11/2006 |
| WO | 9428743 | 12/1994 |
| WO | 9631128 | 10/1996 |
| WO | 9925198 | 5/1999 |
| WO | 0101794 | 1/2001 |
| WO | 0121012 | 3/2001 |
| WO | 0126479 | 4/2001 |
| WO | WO 01/26479 | * 4/2001 |

OTHER PUBLICATIONS

MacGregor, A. W. 1993. Barley: Chemistry and Technology. American Association of Cereal Chemists, Inc. St Paul Minnesota. p. 93.*
Wood P. J. et al. article entitled "Effect of Dose and Modification of Viscous Properties of Oat Gum On Plasma Glucose and Insulin Following an Oral Glucose Load"—British Journal of Nutrition, vol. 72, pp. 731-743, 1994.

* cited by examiner

*Primary Examiner*—Carolyn A Paden
(74) *Attorney, Agent, or Firm*—K&L Gates LLP

(57) ABSTRACT

A beverage powder which is able to progressively increase the viscosity of liquids. The beverage powder contains particles of a gelatinised cereal fraction containing β-glucan. The particles have a particle size of less than about 350 μm. When dissolved in liquid to provide a beverage having a β-glucan concentration of about 0.4% to about 1.5% by weight, the beverage powder progressively increases the viscosity of the beverage such that, after about 15 minutes at room temperature, the beverage has a viscosity below about 350 mPa·s but which rapidly develops a final viscosity of above about 1000 mPa·s at body temperature.

20 Claims, No Drawings

BEVERAGE POWDER

PRIORITY CLAIM

This application is a continuation of U.S. patent application Ser. No. 10/471,512 filed on Mar. 29, 2004, now abandoned, which is a U.S. national stage application of PCT/EP02/03160 filed on Mar. 15, 2002, the entire disclosures of which are hereby incorporated.

BACKGROUND

This invention relates to a beverage powder which, when dissolved in a liquid, progressively increases the viscosity of the liquid. The beverage powder may be used in the preparation of liquid meals having extended glycaemic response. The liquid meals may be used in weight loss programs, to enhance athletic performance, by diabetics and to control blood cholesterol.

Foods which have reduced glycaemic response have many applications. One of these applications is the induction of satiety. Some foods are more effective in reducing hunger than others. Protein has a larger effect than either fat or carbohydrate in satisfying appetite. This has led to use of the protein sparing modified fast in weight control, a protein rich diet in which carbohydrate is almost absent. Further it appears that hyperinsulinemia is an important factor for increasing hunger and food intake. Significant reduction of size of the next meal has been achieved when the carbohydrate source was fructose only. This reduction is suppressed as soon as glucose, sucrose or starch is present. Therefore, to reduce hunger, the metabolic response to a carbohydrate load should be minimised as much as possible.

The glycaemic response to food is also an important factor in the nutritional control of diabetes. Being able to reduce the glucose and insulin responses in plasma after a meal will enable better control of diabetes. Hence another application of foods which have reduced glycaemic response is in the nutritional control of diabetes.

The most important attributes of soluble fibre are its potential for lowering postprandial glycaemia and insulin response and its ability to decrease plasma cholesterol. For example, Jenkins et al., 1978, *Br. Med. J.*, 1, 1392-1394 have shown, that soluble fibre was most effective in reducing the rise in blood glucose and insulin when it had the highest viscosity. The most effective soluble fibre studied was guar gum. Wood et al.; 1994; *Brit. J. Nutr.*, 72: 731-743 have determined that increasing dose of oat gum reduces plasma glucose and insulin responses. Oat gum is an oat extract which is composed mainly of the polysaccharide β-glucan. Further, reduction of the viscosity of oat gum by acid hydrolysis reduced or eliminated the capacity to decrease postprandial glucose and insulin levels. Peak plasma glucose response was inversely related to the logarithm of the viscosity of the solution. The biggest attenuation was reached with a viscosity of more than 1500 mPa·s, the level obtained with 1.4% oat gum (or 1.2% β-glucan). This viscosity is considerable and would make any drink practically unpalatable. Consequently, Wood et al. tested a powder of oat gum which was agglomerated with maltodextrin, and when added to a drink developed viscosity progressively. Such a powder is commercially available under the name INSTAGUM® (Zumbro Inc, Hayfield, Minn., USA). This powder is an agglomerated mix of oat gum and maltodextrin (ratio 1:4). A similar powder is described in U.S. Pat. No. 5,476,675.

While these powders are effective in reducing glucose and insulin levels in plasma, the beverages produced from them become very viscous, very quickly. For example, a beverage produced by dissolving the INSTAGUM® powder in liquid at a concentration sufficient to have an effect on glycaemic response, has a viscosity about one half of the maximum viscosity within 3 to 4 minutes. Ordinarily, a viscosity of about one half of the maximum viscosity would make the beverage too viscous to be palatable. Hence the beverage must be consumed immediately after reconstitution.

It is therefore an object of this invention to provide a beverage powder which, when dissolved in liquids, results in a beverage with progressively increasing viscosity.

SUMMARY

Accordingly, in one aspect, this invention provides a beverage powder which is able to progressively increase the viscosity of liquids, the beverage powder comprising particles of a gelatinised cereal fraction containing β-glucan, the particles having a particle size of less than about 350 μm.

It is surprisingly found that the beverage powder, when dispersed in liquids to provide a β-glucan concentration of about 0.4% to about 1.5% by weight, progressively increases the viscosity of the beverage at room temperature such that, after about 15 minutes, the beverage still has a viscosity below about 350 mPa·s. However, upon being raised to body temperature, the beverage more rapidly develops a final viscosity of above about 1000 mPa·s. Hence the beverage attains sufficient viscosity in vivo to have a positive effect upon glycaemic response but, at room temperature, increases in viscosity sufficiently slowly that the palatability of the beverage remains good for at least about 15 minutes.

The gelatinised cereal fraction is preferably in expanded form; for example such as produced by extrusion cooking.

Preferably, the gelatinised cereal fraction contains above about 8% by weight of β-glucan. More preferably, the gelatinised cereal fraction may contain about 10% to about 30% by weight of β-glucan. For example, the gelatinised cereal fraction may contain about 12% to about 18% by weight of β-glucan.

The gelatinised cereal fraction is preferably a gelatinised oat bran concentrate or a gelatinised barley concentrate. A gelatinised oat bran concentrate is particularly preferred.

The particle preferably have a particle size of less than about 300 μm; for example about 5 μm to about 150 μm. Preferably, greater than about 90% of the particles have a size less than about 130 μm.

In a further aspect, this invention provides a beverage powder comprising particles of a gelatinised cereal fraction containing β-glucan and which when dissolved in liquid to provide a β-glucan concentration of about 0.4% to about 1.5% by weight, progressively increases the viscosity of the liquid such that, after about 15 minutes at room temperature, the liquid has a viscosity below about 350 mPa·s but which develops a final viscosity of above about 1000 mPa·s at body temperature.

In a yet further aspect, this invention provides a beverage powder comprising particles of a gelatinised cereal fraction containing β-glucan and which when dissolved in liquid to provide a beverage having a β-glucan concentration of about 0.4% to about 1.5% by weight, progressively increases the viscosity of the beverage at room temperature at a rate at least about 10 times less than that at body temperature; the final viscosity reached being above about 1000 mPa·s.

In another aspect, this invention provides a process for preparing a beverage powder which is able to progressively increase the viscosity of liquids, the process comprising: gelatinising a cereal fraction which contains β-glucan by extrusion cooking it; and comminuting the gelatinised cereal fraction to provide particles having a particle size of less than about 350 µm.

DETAILED DESCRIPTION

Embodiments of the invention are now described, by way of example only. This invention is based upon the surprising discovery that a gelatinised cereal fraction containing β-glucan and which has a particle size of less than about 350 µm, provides liquids of which the viscosity increases slowly at room temperature but rapidly at body temperature. Therefore the gelatinised cereal fraction may be used to provide a beverage powder which is able to increase the viscosity of liquid foods while keeping the liquid food palatable for longer periods at room temperature. However, once consumed, the beverage rapidly increases in viscosity in the body.

In this specification, "room temperature" means a temperature in the range of about 15° C. to about 30° C. "Body temperature" means a temperature in the range of about 35° C. to about 40° C.

The cereal fraction is a fibre rich cereal fraction; for example having a total fibre content of at least 25% by weight and a soluble fibre content (the soluble fibre being predominantly β-glucan) of at least 10% by weight. The fibre rich cereal fraction may be any suitable cereal fraction; for example oat bran concentrate or barley concentrate. Particularly suitable is oat bran concentrate (for example obtained from Oat Fiber AB of Sweden).

The most preferred cereal concentrate is a de-fatted oat bran concentrate. A "de-fatted oat bran concentrate" is an oat bran fraction which has a soluble fibre content of above about 10% by weight and which has been subjected to solvent extraction to remove, at least partially, oils and fats from the fraction. Ordinarily, oat bran concentrates have a fat or oil content of greater than about 10% by weight. De-fatted oat bran concentrates have an oil or fat content of less than about 7% by weight; more usually about 4% to about 6% by weight.

The cereal fraction may be gelatinised by any suitable procedure. However, a particularly suitable procedure is extrusion cooking. Extrusion cooking is conveniently carried out by feeding a dry mix containing the cereal fraction into an extruder-cooker. The dry mix comprises primarily the cereal fraction but may contain additives. Examples of additives include sugar, maltodextrin, wheat flour, rice flour, corn flour, barley flour, oat flour, rye flour, flavouring agents, colouring agents, salts, antioxidants, vitamins, minerals, protein sources, malts, sources of insoluble fibre and the like.

It is found that the addition of small amounts of sugar into the dry mix surprisingly increase the final viscosity attained by the beverage. Preferably, the dry mix contains up to about 20% by weight of sugar. However, the amount of the additives used should not be such that the content of the soluble fibre in the dry mix falls below about 10% by weight on a dry basis. Of course, it is not necessary to add additives.

Any suitable extrusion cooker may be used; single crew or twin screw. Suitable extrusion cookers may be commercially obtained; for example the Wenger and Clextral extrusion cookers.

Water is also fed into the extruder-cooker, usually into the second zone of the extruder-cooker, to enable gelatinisation of the cereal fraction. The amount of water used may be selected as desired but preferably makes up less than about 25% by weight of the total weight of the water and dry mix. Steam may also be used in place of water.

The rotational speed of the screw or screws is preferably kept below about 500 rpm. Above about 500 rpm, it is found that the soluble fibres are degraded due to the high shear and the end product produces lower viscosities in the stomach and small intestine. Rotational speeds in the range of about 200 rpm to about 450 rpm are suitable; particularly rotational speeds in the range of 250 to 350 rpm.

The pressure in the shear and compression zones of the extruder-cooker is preferably kept below about 200 bars; for example a pressure in the range of about 100 to about 180 bars would be suitable. Particularly advantageous are pressures in the range of about 120 bar to about 140 bar.

The maximum product temperature in the extruder is preferably kept below about 200° C.; for example in the range of about 80° C. to about 200° C. Particularly preferred are maximum product temperatures in the range of about 120° C. to about 190° C.; for example about 150° C. to about 180° C.

Upon leaving the extruder-cooker, the gelatinised cereal fraction may have a density of about 250-600 g/l, preferably about 280-500 g/l, and even more preferably 300-400 g/l. If the density is too low, namely below 250 g/l, possibly below 280 g/l or even below 300 g/l there is a risk that the product too quickly swells at 20° C.

Further details of a suitable process for extrusion cooking of the cereal fraction may be obtained from WO 96/31128; the disclosure of which is incorporated by reference.

Upon leaving the extruder-cooker, the gelatinised cereal fraction may be cut into small pieces using rotating blades at the exit. The pieces are then comminuted to a size below about 350 µm. If necessary, the pieces may be dried prior to being comminuted. The comminuting may take place in any suitable comminuting apparatus; for example a mill.

It is found that the beverage powder performs best when the particle size of the gelatinised cereal fraction is less than about 300 µm. In fact, it is found that the smaller the particle size, the better the organoleptic properties of the beverage. Also, the final viscosity of the beverage may be greater. Particles having a particle size of about 5 µm to about 150 µm are found to be particularly suitable in terms of organoleptic properties and final viscosity. Further, more than about 90% of the particles preferably have a particle size less than about 130 µm. An average particle size of less than about 60 µm is particularly preferred.

The beverage powder may contain other particulate components. For example, the beverage powder may contain a carbohydrate source. Suitable carbohydrate sources include sucrose, glucose, maltodextrin, corn starch, or modified starch, sucrose, or mixtures thereof. Sucrose and maltodextrin are particularly preferred.

The beverage powder preferably contains up to about 40% by weight of the carbohydrate source; more preferably about 5% to about 35% by weight of the carbohydrate source.

The beverage powder may contain a protein source. Suitable protein sources include whey, casein, milk proteins, soy protein, rice protein, pea protein, carob protein, oat protein, caseino-glyco-macropeptide or mixtures of these proteins. Further, if desired, the protein source may further include free amino acids.

If used, the beverage powder preferably contains up to about 40% by weight of the protein source; more preferably about 10% to about 35% by weight protein source.

If desired, the beverage powder may also contain a lipid source. Suitable lipid sources are sunflower oil, rapeseed oil, safflower oil, soy oil, milk fat, corn oil, coconut oil, and soy lecithin.

The beverage powder may also contain vitamins, minerals, flavours, artificial sweeteners, and the like.

The ingredients of the beverage powder, which are in addition to the gelatinised cereal fraction, may be included by dry mixing the additional ingredients with the particles of the gelatinised cereal fraction. Alternatively, the additional ingredients may be agglomerated with the particles of the gelatinised cereal fraction. Any suitable agglomeration technique may be used The agglomerates obtained may have a particle size of greater than about 350 μm but the particles of gelatinised cereal fraction should not have a size greater than 350 μm. Further, any additional ingredient which may be processed in an extruder-cooker without losing its functionality, may be incorporated into the dry mix fed into the extruder-cooker.

The beverage powder, when reconstituted with a liquid to provide about 0.4 to about 1.5 g/100 ml of β-glucan, provides a beverage of which the viscosity increases at a rate such that less than about 25% of the maximum viscosity is reached within 15 minutes at room temperature. Preferably, the viscosity after 15 minutes at room temperature is less than about 20%, more preferably less than about 10%, of the maximum viscosity reached. For example, a viscosity below about 350 mPa·s, preferably less than about 250 mPa·s, more preferably less than about 150 mPa·s, and even more preferably less than about 100 mPa·s is reached after 15 minutes at room temperature.

Further, the maximum viscosity reached is at least about 1000 mPa·s; more preferably at least about 1300 mPa·s, at body temperature. The maximum viscosity is preferably reached within about 60 minutes. The rate at which the viscosity of the beverage increases at 20° C. is preferably at least 10 times less than at 37° C.

The beverage powder may be used as nutritional support in weight control programs. In this application, the beverage powder may be dissolved in milk to provide a liquid meal of adequate nutritional and energy content. Since the liquid meal induces a feeling of satiety, the consumer is less likely to consume foods outside of regular meals.

Further, the beverage powder may be used in the nutritional control of cholesterol. The FDA has published a rule on the relationship between soluble fibre from whole oats and reduced risk of coronary heart disease. It concludes that β-glucan is the primary component responsible for the hypocholesterolemic properties of oats, when it is part of a diet that is low in saturated fat and cholesterol. The agency also acknowledged the likelihood that consumption of β-glucan from sources other than whole oats will affect blood lipid levels. A significant lowering of serum cholesterol levels can thus be anticipated with daily consumption of 3 g of β-glucan. The FDA recommends 4 portions of 0.75 g.

The beverage powder, when consumed, may operate to lower blood glucose and insulin levels and hence may be used in the nutritional control of diabetes. For the nutritional control of diabetes, the dosage of the beverage powder required will vary depending upon the risk and severity of the disease and on diet but may be readily set by a medical practitioner. However a daily dosage corresponding to between about 1 g of β-glucan to about 25 g of β-glucan would be adequate for most purposes. A daily dosage corresponding to between about 3 g of β-glucan to about 15 g of β-glucan is preferred.

The beverage powder, when consumed, results in an increase in blood glucose levels as do other food compositions which contain an equivalent amount of carbohydrates but no soluble fibre. However, the raised blood glucose levels induced by the beverage powder remain raised over extended periods in comparison. In particular, little noticeable decrease in blood glucose levels occurs upon onset of exercise. Consequently the onset of hypoglycaemia may be prevented or delayed for significant periods of time. Further the onset of fatigue may be delayed; increasing exercise performance. Further the symptoms associated with acid reflux are prevented or reduced.

Specific examples of the invention are now given as further illustration.

EXAMPLE 1

A dry mixture of oat bran concentrate and minor amounts of salts and colouring agents is prepared. The oat bran concentrate is obtained from Oat Fiber AB, Varobacka, Sweden and contains about 35% dietary fibre in total and about 17% soluble fibre. The dry mixture containing 10% sugar is fed into a Clextral BC-45H extruder. The temperature of the three zones of the extruder are 18° C., 74° C. and 103° C. The temperature at the exit of the extruder is 160° C. The pressure in the extruder reaches 126 bar. The product leaving the extruder orifices is cut into pieces of length of about 2 to 3 mm.

The pieces are then milled using a Poitemill and sieved to pass through either a 250 μm sieve or a 125 μm sieve. The particles have a water content of about 2.3%.

EXAMPLE 2

Two dry mixes each containing about 50% by weight oat bran particles of example 1, about 35% by weight of sugar, about 14.6% by weight of strawberry flavour, and colouring agents are prepared. One dry mix contains oat bran particles of size less than 125 μm and the other of size less than 250 μm.

An amount of 35 g of each dry mix is dispersed in 240 ml of milk by mixing for 10 seconds at 650 rpm. The viscosity increase of the beverage is then monitored using a RAPID VISCO-ANALYSER (RVA). The beverage stirred at 160 rpm during measurement. The viscometer is operated in accordance with manufacturer's instructions. The results are as follows:

| Particle Size (μm) | Viscosity at 5 minutes at 20° C. (mPa · s) | Viscosity at 15 minutes at 20° C. (mPa · s) | Final Viscosity at 37° C. (mPa · s) |
|---|---|---|---|
| 125 | 125 | 278 | 1620 |
| 250 | 95 | 254 | 1394 |

Both beverages exhibit good viscosity increase profiles. The viscosity after 15 minutes at room temperature is sufficiently low such that the beverage is still palatable. However, the final viscosity at body temperature is high enough to induce the desired beneficial effect.

Both beverages are tasted and found to have good organoleptic properties. However the beverage produced from the oat bran particles of 125 μm size has a smoother mouthfeel.

For comparison, a similar amount of a commercially available beverage powder (SWEET SUCCESS®) obtained from Nestle USA, Inc.) intended for weight control programs is dissolved in 240 ml of milk. This beverage powder contains guar gum and carrageenan. The viscosity increases as follows:

| Product | Viscosity at 5 minutes at 20° C. (mPa · s) | Viscosity at 15 minutes at 20° C. (mPa · s) | Final Viscosity at 37° C. (mPa · s) |
|---|---|---|---|
| SWEET SUCCESS | 352 | 400 | 400 |

The beverage powder rapidly reaches its maximum viscosity. Also, the maximum viscosity is low.

EXAMPLE 3

Am amount of 20 g of oat bran particles of example 1, of particle size less than 125 μm, is dispersed in 200 ml milk. The beverage contains 1.4 g of β-glucan. The beverage is mixed for 10 seconds at 650 rpm.

The viscosity increase of the beverage is then monitored using a RAPID VISCO-ANALYSER (RVA). The beverage stirred at 160 rpm during measurement. The viscometer is operated in accordance with manufacturer's instructions.

The viscosity of the beverage is monitored for about 10 minutes at 20° C. Thereafter the beverage is rapidly heated to 37° C. and the viscosity monitored for another 60 minutes.

| Time (minutes) | Viscosity (mPa · s) |
|---|---|
| Upon dispersion | 25 |
| 10 | 25 |
| 20 | 320 |
| 30 | 690 |
| 40 | 870 |
| 50 | 990 |
| 60 | 1060 |
| 70 | 1100 |

The beverage undergoes substantially no increase in viscosity during the first 10 minutes at 20° C. Therefore a consumer need not consume it immediately after reconstitution. However, upon being heated to 37° C., the viscosity of the beverage rapidly increases. Hence, once consumed, the viscosity in the gastro-intestinal tract of the consumer can be expected to rapidly increase.

EXAMPLE 4

A dry mix containing about 50% by weight oat bran particles of example 1, about 25% by weight of sugar, about 25% by weight of whey protein concentrate, and minerals, vitamins and flavour is prepared. The oat bran particles are of size less than 125 μm.

An amount of 35 g of the dry mix is dispersed in 220 ml of skimmed milk. The beverage contains:

| Component | Amount |
|---|---|
| Protein | 20.5 g |
| Carbohydrate | 27.5 g |
| Lipid | 2 g |
| Dietary fibre | 5.1 g |
| B-glucan | 2.6 g |
| Energy | 210 kcal |

After 15 minutes at room temperature, the beverage still has an acceptable viscosity. The final viscosity exceeds 1000 mPa·s.

EXAMPLE 5

A dry mix containing about 38% by weight oat bran particles of example 1, about 23% by weight of sugar, about 39% by weight of maltodextrin, and minerals, vitamins and flavour is prepared. The oat bran particles are of size less than 125 μm.

An amount of 21.5 g of the dry mix is dispersed in 100 ml of water. The beverage has an energy content of about 740 kcal/l. After 15 minutes at room temperature, the beverage still has an acceptable viscosity. The final viscosity exceeds 1000 mPa·s.

EXAMPLE 6

A dry mix containing about 68.5% by weight oat bran particles of example 1, about 21.1% by weight of sugar, about 10.1% by weight of cacoa is prepared. The oat bran particles are of size less than 125 μm.

An amount of 31.3 g of the dry mix and 6.5 g of maltodextrin is dispersed in 245 ml of skimmed milk. The beverage has an energy content of about 850 kcal/l. After 15 minutes at room temperature, the beverage still has an acceptable viscosity of less than about 100 mPa·s. The final viscosity exceeds 1000 mPa·s.

The invention is claimed as follows:

1. A method of preparing a beverage, the method comprising providing a beverage powder which is able to progressively increase the viscosity of liquids upon an increase in temperature, the beverage powder comprising particles of a gelatinised cereal fraction containing about 10% to about 30% by weight of β-glucan, the particles having a particle size of less than about 350 μm, and dissolving the powder in a liquid to form a beverage, wherein after about 15 minutes at room temperature, the beverage has a viscosity below about 350 mPa·s and develops a final viscosity of above about 1000 mPa·s at body temperature, wherein the gelatinised cereal fraction comprises a gelatinised oat bran concentrate.

2. The method of claim 1, wherein the particles have a particle size of less than about 150 μm.

3. The method of claim 2 in which the gelatinised cereal fraction is expanded.

4. The method of claim 1, wherein the beverage powder further comprises a carbohydrate source.

5. The method of claim 1, wherein the beverage powder further comprises a protein source.

6. A beverage powder comprising particles of a gelatinised cereal fraction containing about 10% to about 30% by weight of β-glucan and which when dissolved in a liquid provides a β-glucan concentration of about 0.4% to about 1.5% by weight, progressively increases the viscosity of the liquid upon an increase in temperature such that, after about 15 minutes at room temperature, the liquid has a viscosity below about 350 mPa·s and develops a final viscosity of above about 1000 mPa·s at body temperature, wherein the gelatinised cereal fraction comprises a gelatinised oat bran concentrate.

7. The beverage powder of claim 6, wherein the particles have a particles size of less than about 350 μm.

8. The beverage powder of claim 7 in which the gelatinized cereal fraction is expanded.

9. The beverage powder of claim 6 further comprising a carbohydrate source.

10. The beverage powder of claim 6 further comprising a protein source.

11. A beverage powder comprising particles of a gelatinised cereal fraction containing about 10% to about 30% by weight of β-glucan and which when dissolved in a liquid provides a beverage having a β-glucan concentration of about 0.4% to about 1.5% by weight, progressively increases the viscosity of the beverage upon an increase in temperature such that, after about 15 minutes at room temperature, the viscosity is less than about 25% of the final viscosity reached, the final viscosity, being above about 1000 mPa·s, wherein the gelatinised cereal comprises a gelatinised oat bran concentrate.

12. The beverage powder of claim 11, wherein the particles have a particles size of less than about 350 μm.

13. The beverage powder of claim 12 in which the gelatinised cereal fraction is expanded.

14. The beverage powder of claim 11 further comprising a carbohydrate source.

15. The beverage powder of claim 11 further comprising a protein source.

16. A beverage powder comprising particles of a gelatinised cereal fraction containing about 10% to about 30% by weight of β-glucan and which when dissolved in a liquid provides a beverage having a β-glucan concentration of about 0.4% to about 1.5% by weight, progressively increases the viscosity of the beverage at room temperature at a rate at least about 10 times less than that at body temperature, the final viscosity reached being above about 1000 mPa·s, wherein the gelatinised cereal fraction comprises a gelatinised oat bran concentrate.

17. The beverage powder of claim 16, wherein the particles have a particle size of less than about 150 μm.

18. The beverage powder of claim 17 in which the gelatinised cereal fraction is expanded.

19. The beverage powder of claim 16 further comprising a carbohydrate source.

20. The beverage powder of claim 16 further comprising a protein source.

* * * * *